(12) United States Patent
Xu

(10) Patent No.: US 10,948,398 B1
(45) Date of Patent: Mar. 16, 2021

(54) SYSTEM AND METHOD FOR DETECTING NON-CONTACT REPELLENCY OF A COMPOUND CANDIDATE FROM DROSOPHILA

(71) Applicant: Peng Xu, Lansing, MI (US)

(72) Inventor: Peng Xu, Lansing, MI (US)

( * ) Notice: Subject to any disclaimer, the term of this patent is extended or adjusted under 35 U.S.C. 154(b) by 352 days.

(21) Appl. No.: 15/986,097

(22) Filed: May 22, 2018

(51) Int. Cl.
| | | |
|---|---|---|
| *A01M 1/20* | (2006.01) | |
| *A01M 1/00* | (2006.01) | |
| *G01N 17/00* | (2006.01) | |
| *A01M 1/10* | (2006.01) | |

(52) U.S. Cl.
CPC ........... *G01N 17/002* (2013.01); *A01M 1/106* (2013.01); *A01M 1/2027* (2013.01); *A01M 1/2055* (2013.01)

(58) Field of Classification Search
CPC ........ A01K 1/0047; A01K 1/03; A01K 1/031; A01K 67/033
See application file for complete search history.

(56) References Cited

U.S. PATENT DOCUMENTS

| | | | | |
|---|---|---|---|---|
| 3,653,357 A | * | 4/1972 | Sheidlower | A01K 63/003 119/6.5 |
| 4,748,860 A | * | 6/1988 | Butler | A01N 25/20 424/84 |
| 5,439,941 A | * | 8/1995 | Butler | A01N 45/02 514/690 |
| 5,577,464 A | * | 11/1996 | Wellington | A01K 1/03 119/452 |
| 10,245,343 B2 | * | 4/2019 | Pryne | A01M 1/2061 |
| 2003/0138470 A1 | * | 7/2003 | Sakurai | A01N 31/02 424/405 |
| 2010/0236709 A1 | * | 9/2010 | Mutch | A61K 8/31 156/278 |
| 2014/0020630 A1 | * | 1/2014 | Courtright | A01K 67/033 119/6.6 |

FOREIGN PATENT DOCUMENTS

JP 2016108311 A * 6/2016

* cited by examiner

*Primary Examiner* — Jill E Culler
*Assistant Examiner* — Ruben C Parco, Jr.
(74) *Attorney, Agent, or Firm* — Richard Eldredge; Leavitt Eldredge Law Firm

(57) ABSTRACT

An assay system for a repellent includes transparent tubing having end chambers; a central testing area positioned between the end chambers; small openings between the central testing area and end chambers; absorbent material positioned adjacent to the openings and being soaked in either a control substance or a repellent; and fruit flies are introduced into the central testing area and allowed to migrate through the openings and into either end chamber.

3 Claims, 3 Drawing Sheets

SYSTEM AND METHOD FOR DETECTING NON-CONTACT REPELLENCY OF A COMPOUND CANDIDATE FROM *DROSOPHILA*

BACKGROUND

1. Field of the Invention

The present invention relates generally to insect repellent testing systems, and more specifically, to a system and method for detecting non-contact repellency of a compound candidate from Drosophila (fruit flies).

2. Description of Related Art

Many insects exhibit the innate ability to detect signals from the environment. These signals can be through cues like olfaction, gustation, vision and so on, via both contact and non-contact response and provide a means for the insect to make decisions. Drosophila melanogaster is one of the most commonly used biological specimens for scientists to explore the neural circuit basis of behavior. The present invention provides a means to study how Drosophila make their decision when they encounter airborne and/or volatile repellent compounds, using a modified choice assay based on two choice assay and two traps.

A lot of natural compound show non-contact (spatial) repellency to Drosophila, however the mechanisms may be various. Some may excite peripheral sensory neurons and target aversive pathways that then lead to repellency effect. Alternatively, some may be smelled by flies and trigger an olfactory neuronal circuit that guides the decision of Drosophila to move in the opposite direction. As Drosophila is a model animal which is widely used to study insect behavior response to the external environment, its aversive response to selected candidate compounds (repellents) which may show spatial repellency potency is helpful to understand how insects make decision when they interact with repellents.

Although, some techniques like electrophysiology recording and calcium imaging can detect activity on targeted neurons to understand which systems combine with vapor compound, it still cannot define if the response is attractive or aversive. Behavior assay, however, can tell the repellency effect. Furthermore, only high accuracy repellency assay can help to detect specific neuronal circuit by testing genetic mutant line.

Some systems that analyze behavior require extensive setup, are big, and require large amounts of chemical, while some artificially define a zone to measure flies' aversive decision.

It is therefore an object of the present invention to provide a more objective and effective assay that will facilitate the discovery and development of novel active ingredients with inherent spatial repellent properties. The present design seeks to build a Drosophila non-contact repellency (DNCR) assay which is efficient to show potency of repellent graphically and facilitate the quantify analysis. This assay is a combination of advantages of two choice assay and trap assay to address non-contact repellency in Drosophila.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
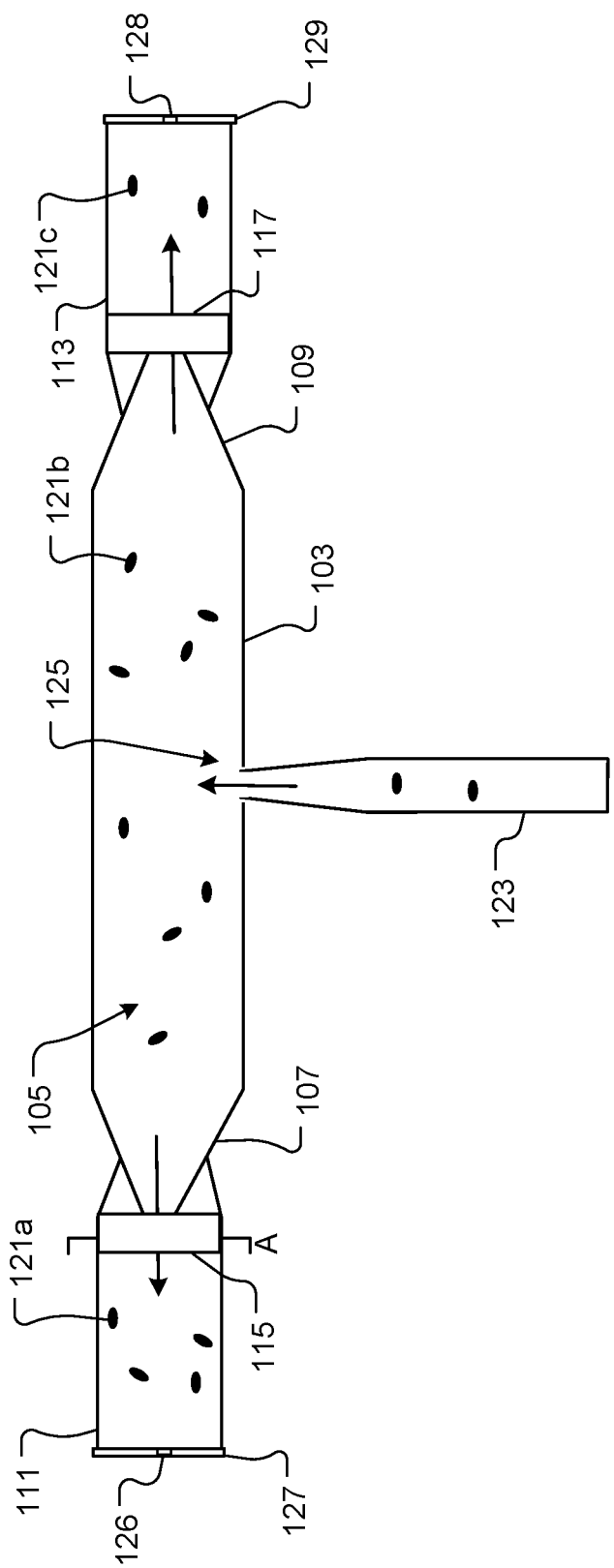
FIG. 1 is a simplified schematic of a non-contact, two choice assay system in accordance with a preferred embodiment of the present application.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional insect repellent analysis systems. Specifically, the present invention provides for improved analysis resulting from the combination of a two choice assay. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIG. 1 depicts a simplified schematic of a non-contact, two choice assay system 101 in accordance with a preferred embodiment of the present application. It will be appreciated that system 101 overcomes one or more of the above-listed problems commonly associated with conventional insect repellent analysis systems.

In the contemplated embodiment, system 101 includes transparent tubing 103 having a central testing area 105 and first tapered end 107 and a second tapered end 109. The transparent tubing 103 is configured to extend to two end chambers 111, 113, wherein small openings 201 extend into the chambers.

System 101 further includes a first absorbent material 115 being embedded with a control substance 203. In addition, system 101 includes a second absorbent material 117, embedded with a repellent. It should be appreciated that the absorbent material can be paper, cotton, foam, or any other appropriate material. In some embodiments, the control substance is a solvent. The repellent substance can be any chemical for which the user decides to test, such as DEET or pyrethrum.

Figure 2:
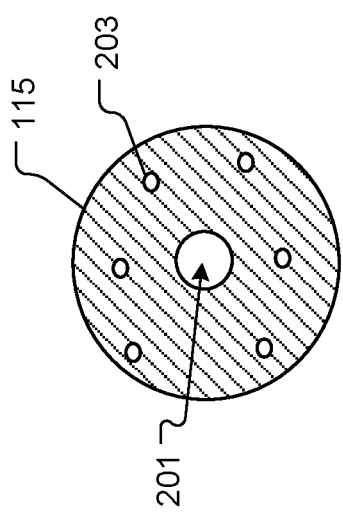
FIG. 2 is a cross sectional view taken from A-A of FIG. 1.

As shown in FIG. 2, opening 201 extends through the absorbent material 115, thereby holding the repellent and control substance away from the opening.

Figure 3:
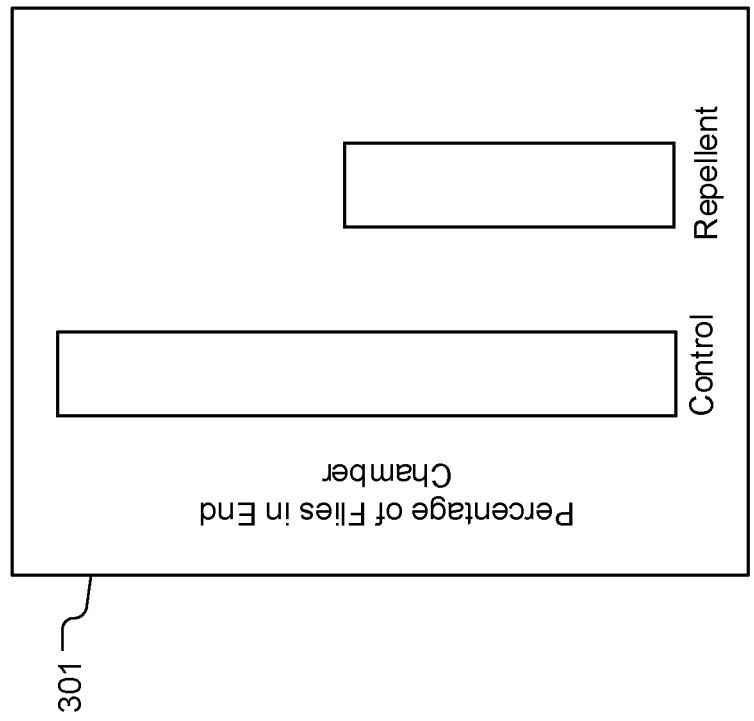
FIG. 3 is a graphical representation of FIG. 1.

System 101 is used for analyzing the effects of the control substance and repellent on a plurality of flies 121a-c. During use, a plurality of flies are allowed to enter the central testing area 105 via a pipet 123, wherein a tip of the pipet can be inserted into the central testing area 105 via a hole 125. The flies can enter area 105 wherein the substances embedded on materials 115, 117 are exposed to the flies in a non-contact method, the flies can then move toward either chamber 111, 113. The flies enter the chambers via the small holes. Once a pre-determined amount of time has passed, the user can inspect the chambers to determine percentages of flies in each chamber, as shown in FIG. 3, chart 301. The user can then analyze the results to determine the effect of the non-contact repellent.

It should be appreciated that in some embodiments, the end chambers 111, 113 can be closed via caps 127, 129. In the preferred embodiment, the caps 127, 129 include small holes 126, 128, thereby allowing for concentration gradient to be created by the repellant and the control substance. It should further be appreciated that the size, materials, and components can be altered to achieve the same functionality.

It should be appreciated that one of the unique features believed characteristic of the present application is the structural features creating a two-side test system, wherein a test chamber is created and the flies can be allowed to travel into the chamber safely. In addition, the small holes extending into the end chambers allow for the flies to travel without coming into direct contact with any chemicals.

Figure 4:
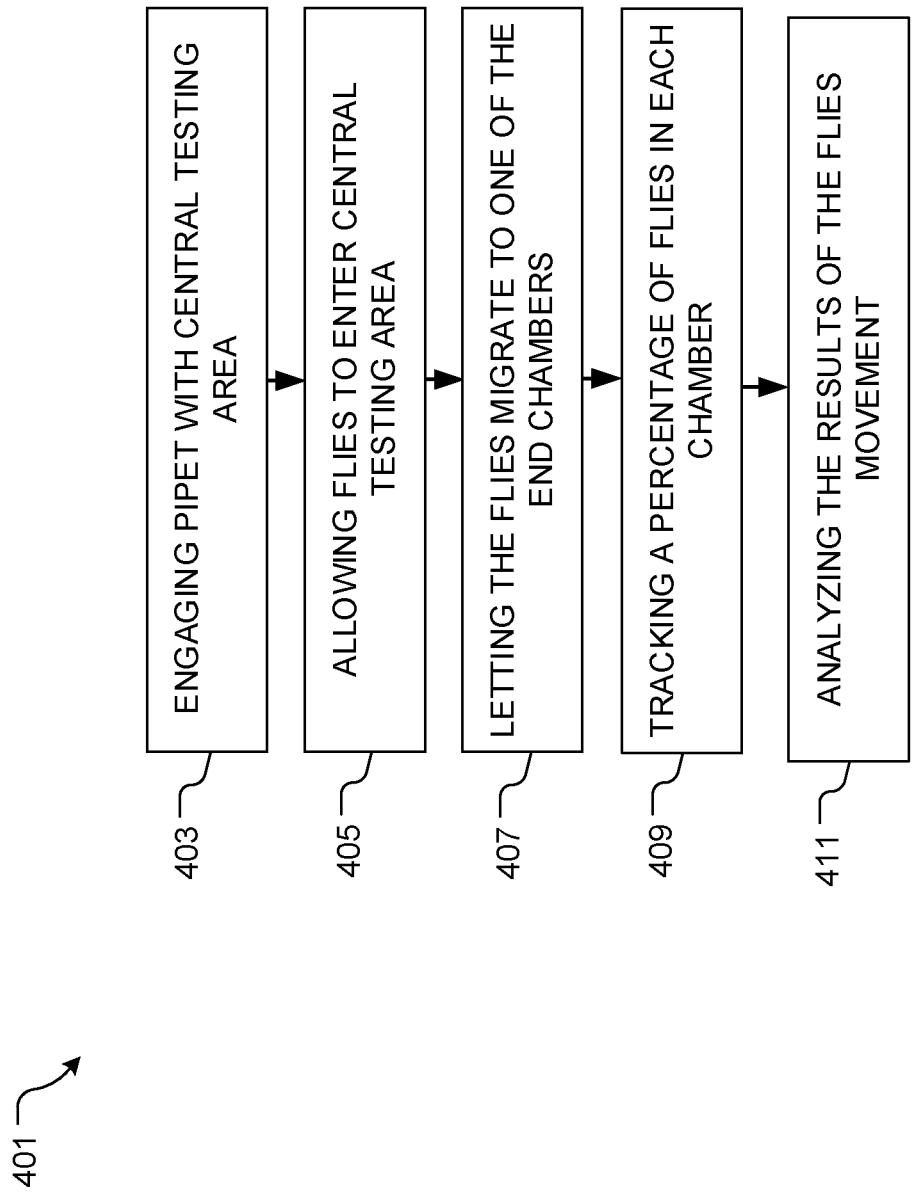
FIG. 4 is a flowchart of the method of use of the system of FIG. 2.

In FIG. 4, a flowchart depicts a method of use of system 101. During use, the pipet is engaged with the hole in the central testing area, thereby allowing for the flies to safely enter the testing area, as shown with boxes 403, 405. The system is left for a predetermined amount of time, wherein the flies may migrate into either of the end chambers, as shown with box 407. The user can then determine and graph percentages of flies in each chamber to determine the effect of the repellent, as shown with boxes 409, 411.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. An assay system for a repellent, the system comprising:
a transparent tubing extending from a first end to a second end, the transparent tubing having:
a first end chamber secured to the first end and a second end chamber secured to the second end;
a central testing area positioned between the first end chamber and the second end chamber;
a first small opening between the central testing area and the first end chamber;
a second small opening between the central testing area and the second end chamber;
a first absorbent material having a control substance embedded therein, the first absorbent material being positioned adjacent to the first small opening, the first absorbent material is composed of an absorbent material and having a first opening extending therethrough, the first opening providing passage between the transparent tubing and the first chamber;
a first cap secured to the first chamber, the first cap having a first hole extending therethrough;
a second absorbent material having a repellent embedded therein, the second absorbent material being positioned adjacent to the second small opening, the second absorbent material is composed of an absorbent material and having a second opening extending therethrough, the second opening providing passage between the transparent tubing and the second chamber;
a second cap secured to the second chamber, the second cap having a second hole extending therethrough; and
a pipet integral with and extending from the transparent tubing;
wherein a plurality of fruit flies are introduced into the central testing area and allowed to migrate through either the first opening or the second opening, thereby providing analysis as to effectiveness of the repellent material.

2. The system of claim 1, wherein the central testing area further comprises:
a first tapered end extending into the first end chamber; and
a second tapered end extending into the second end chamber.

3. A method of analyzing repellent, the method comprising:
providing the system of claim 1;
allowing the plurality of fruit flies to enter the central testing area via the pipet;
observing the plurality of fruit flies as a portion of the plurality of fruit flies migrate to either the first end chamber or second end chamber; tracking percentages of the plurality of fruit flies; and analyzing results to determine an effectiveness of the repellent.

* * * * *